United States Patent
Nieminen et al.

(10) Patent No.: US 12,521,097 B2
(45) Date of Patent: *Jan. 13, 2026

(54) SYSTEMS AND METHODS FOR AIR COOLED ULTRASOUND TRANSDUCERS VIA CAVITY ON THE PROBE

(71) Applicant: FUJIFILM SONOSITE, INC., Bothell, WA (US)

(72) Inventors: Greg Nieminen, Bothell, WA (US); Todd Willsie, Seattle, WA (US); Evan McCormack, Kenmore, WA (US)

(73) Assignee: FUJIFILM SONOSITE, INC., Bothell, WA (US)

( * ) Notice: Subject to any disclaimer, the term of this patent is extended or adjusted under 35 U.S.C. 154(b) by 482 days.

This patent is subject to a terminal disclaimer.

(21) Appl. No.: 18/063,084

(22) Filed: Dec. 8, 2022

(65) Prior Publication Data
US 2023/0107276 A1    Apr. 6, 2023

Related U.S. Application Data

(63) Continuation of application No. 14/301,299, filed on Jun. 10, 2014, now Pat. No. 11,540,813.

(51) Int. Cl.
*A61B 8/00*    (2006.01)
*A61B 8/08*    (2006.01)

(52) U.S. Cl.
CPC ............ *A61B 8/546* (2013.01); *A61B 8/4455* (2013.01); *A61B 8/08* (2013.01); *A61B 8/4483* (2013.01); *Y10T 29/49007* (2015.01)

(58) Field of Classification Search
CPC ......... A61B 8/546; A61B 8/4455; A61B 8/08; A61B 8/4483; Y10T 29/49007;
(Continued)

(56) References Cited

U.S. PATENT DOCUMENTS 4,973,247 A    11/1990    Varnes et al.
5,353,868 A    10/1994    Abbott
(Continued)

FOREIGN PATENT DOCUMENTS

CN    1765329 A    5/2006
CN    1820712 A    8/2006
(Continued)

OTHER PUBLICATIONS

Office Action received for Chinese Patent Application No. 202110388815.1, mailed on May 31, 2024, 24 pages (11 pages of English Translation and 13 pages of Original Document).
(Continued)

*Primary Examiner* — Serkan Akar
(74) *Attorney, Agent, or Firm* — Womble Bond Dickinson (US) LLP

(57) ABSTRACT

Systems and methods of transmitting heat away from an ultrasound probe are disclosed within. In one embodiment, a handheld ultrasound probe includes a transducer, electronics configured to drive the transducer, and a housing surrounding the transducer assembly and the electronics. A slot extending from a first side of the housing to a second side of the housing and can allow air to pass adjacent transducer and the electronics. The slot can be sized to inhibit accessibility of an operator's finger to an inner surface of slot.

10 Claims, 4 Drawing Sheets

(58) Field of Classification Search
CPC .... F28D 15/00; F28D 2021/0028; F28F 1/04; G01S 7/52079; G01S 15/899
See application file for complete search history.

(56) References Cited

U.S. PATENT DOCUMENTS

| | | | |
|---|---|---|---|
| 5,494,038 | A | 2/1996 | Wang et al. |
| 5,551,945 | A | 9/1996 | Yabe et al. |
| 5,560,362 | A | 10/1996 | Sliwa et al. |
| 5,961,465 | A | 10/1999 | Kelly et al. |
| 6,142,945 | A | 11/2000 | Sakamoto et al. |
| 6,142,947 | A | 11/2000 | Tran et al. |
| 8,932,279 | B2 | 1/2015 | Stringham et al. |
| 2005/0038340 | A1 | 2/2005 | Vaezy et al. |
| 2005/0180894 | A1 | 8/2005 | Petroff et al. |
| 2005/0273127 | A1 | 12/2005 | Novak et al. |
| 2006/0100513 | A1 | 5/2006 | Hashimoto |
| 2006/0173344 | A1 | 8/2006 | Marian et al. |
| 2008/0146924 | A1 | 6/2008 | Smith et al. |
| 2009/0071625 | A1 | 3/2009 | Lyon |
| 2010/0109480 | A1 | 5/2010 | Forslund et al. |
| 2010/0211136 | A1 | 8/2010 | De et al. |
| 2010/0228130 | A1 | 9/2010 | Chiang et al. |
| 2010/0331702 | A1 | 12/2010 | Hongou et al. |
| 2012/0143060 | A1 | 6/2012 | Weekamp et al. |
| 2012/0223618 | A1 | 9/2012 | Clark et al. |
| 2013/0023866 | A1 | 1/2013 | Stringham et al. |
| 2013/0115506 | A1 | 5/2013 | Wayne et al. |
| 2013/0286593 | A1 | 10/2013 | Cho et al. |
| 2013/0338508 | A1 | 12/2013 | Nakamura et al. |
| 2014/0058270 | A1 | 2/2014 | Davidsen et al. |
| 2014/0371946 | A1 | 12/2014 | Kwak et al. |
| 2015/0099978 | A1 | 4/2015 | Davidsen et al. |
| 2015/0282878 | A1 | 10/2015 | Kindermann et al. |

FOREIGN PATENT DOCUMENTS

| | | | | |
|---|---|---|---|---|
| CN | 101234030 | A | 8/2008 | |
| CN | 101926655 | A | 12/2010 | |
| CN | 103519849 | A | 1/2014 | |
| JP | 04-250145 | A | 9/1992 | |
| JP | 08-249532 | A | 9/1996 | |
| JP | 2000-315880 | A | 11/2000 | |
| JP | 2006-020755 | A | 1/2006 | |
| JP | 2007-244583 | A | 9/2007 | |
| JP | 2008-194278 | A | 8/2008 | |
| JP | 2008-284003 | A | 11/2008 | |
| JP | 2008-307086 | A | 12/2008 | |
| JP | 2010-088610 | A | 4/2010 | |
| WO | 2014/064608 | A2 | 5/2014 | |
| WO | 2015/029637 | A1 | 3/2015 | |
| WO | WO-2015129938 | A1 * | 9/2015 | ............... A61B 8/00 |

OTHER PUBLICATIONS

CN Office Action received for Chinese Patent Application No. 202110388815.1, mailed on Mar. 24, 2025, 18 pages (11 pages of English Translation and 7 pages of Original Document).
Intention to grant received for European Patent Application No. 21159724.0, mailed on Mar. 28, 2024, 6 pages.
Decision to grant received for European Patent Application No. 15806744.7, mailed on Jul. 15, 2021, 2 pages.
Decision to Grant received for Japanese Patent Application No. 2016-572240, mailed on Oct. 29, 2019, 5 pages (2 pages of English Translation and 3 pages of Original Document).
European search report received for European Patent Application No. 21159724.0, mailed on Jun. 15, 2021, 7 pages.
Intention to grant received for European Patent Application No. 15806744.7, mailed on Mar. 11, 2021, 6 pages.
Intention to grant received for European Patent Application No. 15806744.7, mailed on Nov. 13, 2020, 6 pages.
International Preliminary Report on Patentability received for PCT Patent Application No. PCT/US15/34980, mailed on Dec. 22, 2016, 8 pages.
International Search Report and Written Opinion received for PCT Patent Application No. PCT/US15/34980, mailed on Sep. 16, 2015, 10 pages.
Notice of Allowance received for Chinese Patent Application No. 201580042846.4, mailed on Jan. 28, 2021, 3 pages (2 pages of English Translation and 1 page of Original Document).
Notice of Reasons for Refusal received for Japanese Patent Application No. 2016-572240, mailed on Mar. 12, 2019, 8 pages (4 pages of English Translation and 4 pages of Original Document).
Supplementary European search report received for European Patent Application No. 15806744.7, mailed on Feb. 22, 2018, 12 pages.
The First Office Action received for Chinese Patent Application No. 201580042846.4, mailed on Mar. 19, 2019, 35 pages (19 pages of English Translation and 16 pages of Original Document).
The Fourth Office Action received for Chinese Patent Application No. 201580042846.4, mailed on Nov. 3, 2020, 10 pages (6 pages of English Translation and 4 pages of Original Document).
The Second Office Action received for Chinese Patent Application No. 201580042846.4, mailed on Dec. 16, 2019, 29 pages (18 pages of English Translation and 11 pages of Original Document).
The Third Office Action received for Chinese Patent Application No. 201580042846.4, mailed on Jul. 20, 2020, 25 pages (16 pages of English Translation and 9 pages of Original Document).
Office Action received for Chinese Patent Application No. 202110388815.1, mailed on Nov. 30, 2023, 14 pages (5 pages of English Translation and 9 pages of Original Document).
CN Office Action, including Search Report received for Chinese Patent Application No. 202110388815.1, mailed on Oct. 15, 2024, 22 pages (10 pages of English Translation and 12 pages of Original Document).
Decision to grant received for European Patent Application No. 21159724.0, mailed on Aug. 8, 2024, 2 pages.

* cited by examiner

SYSTEMS AND METHODS FOR AIR COOLED ULTRASOUND TRANSDUCERS VIA CAVITY ON THE PROBE

This application is a continuation of co-pending U.S. application Ser. No. 14/301,299 filed Jun. 10, 2014, which is hereby incorporated by this reference in its entirety.

TECHNICAL FIELD

The disclosed technology relates generally to ultrasound probes, and more specifically to systems and methods of reducing heat of ultrasound probes.

DETAILED DESCRIPTION

Figure 1A:
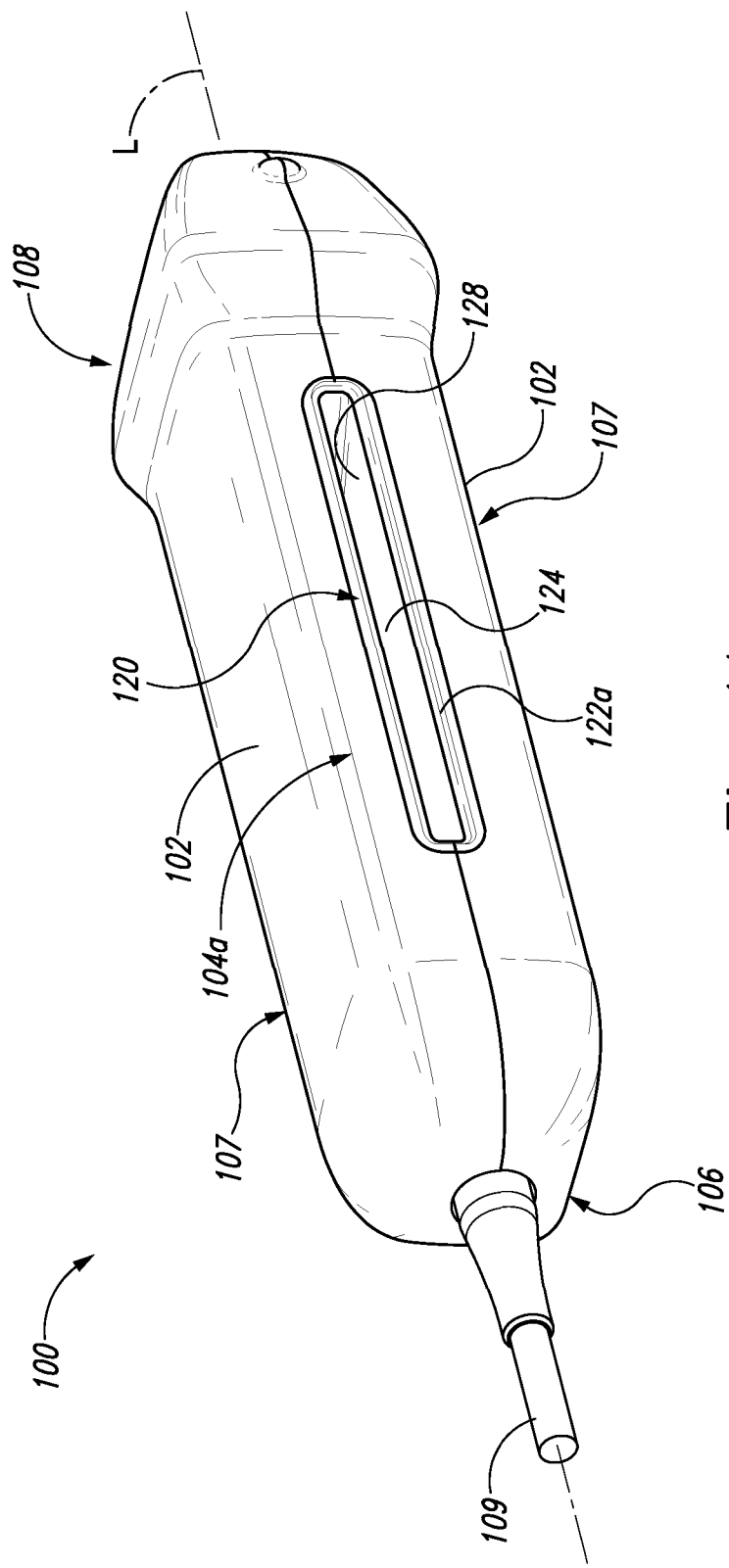
FIG. 1A is an isometric side view of an ultrasound transducer configured in accordance with the disclosed technology.

The disclosed technology is generally directed to systems and methods of cooling ultrasound transducers. It will be appreciated that several of the details set forth below are provided to describe the following embodiments in a manner sufficient to enable a person skilled in the relevant art to make and use the disclosed embodiments. Several of the details described below, however, may not be necessary to practice certain embodiments of the technology. Additionally, the technology can include other embodiments that are within the scope of the claims but are not described in detail with reference to FIGS. 1A-D.

The disclosed technology can reduce an amount of heat emitted from an outer surface of an ultrasound probe. During an ultrasound procedure, for example, an ultrasound transducer in the probe generates, transmits and receives ultrasound energy. Electronics in the probe (e.g., beamforming electronics) can process the signals and produce ultrasound data that can be used to form an ultrasound image. The generation of the ultrasound energy and processing of the ultrasound data can, in some instances, produce temperatures in excess of 60 degrees Celsius within the probe. Such temperatures may raise a temperature of at least a portion of the outer surface of the probe to a point of being uncomfortable or unsafe for an operator to hold and/or a patient to touch. Embodiments of the present technology include, for example, one or more conduits extending through an ultrasound probe allowing internal components to emit heat to air flowing through the conduit(s), thereby reducing a temperature along the outer surface of the probe and/or at the ultrasound transducer array.

In one embodiment, for example, a handheld ultrasound imaging probe includes a transducer assembly, electronics configured to drive the transducer and a housing surrounding the transducer assembly and the electronics. A heat spreader is positioned in the housing and configured to absorb heat from the transducer assembly and the electronics. A conduit extends from a slot in a first side of the housing to a slot in the second side of the housing and allows air to pass adjacent the heat spreader. In one aspect, the conduit has an interior surface sealed from an interior portion of the housing. One or both of the slots can be sized to prevent accessibility to the interior surface by a finger of an operator. For example, one of the slots can have a height that is significantly less than a width of the slot. In some aspects, the heat spreader can be bonded and/or integral to the conduit.

In another embodiment of the disclosed technology, a handheld ultrasound imaging probe includes a housing having a first side portion opposite a second side portion, and an ultrasound transducer array and a circuit disposed within the housing. A first aperture in the first side portion is in fluid communication with a second aperture in the second side portion via a conduit extending through the housing. The conduit includes a sealed interior surface that defines a cavity. In one aspect, the first and second apertures are sized to prevent accessibility by a finger of an operator to the cavity and the interior surface of the conduit. In another aspect, the ultrasound transducer includes a front end and a rear end, and the conduit includes a distal end and a proximal end. An exterior surface at the distal end of the conduit is shaped to define a recess that receives at least a portion of the ultrasound transducer. In some aspects, a thermally conductive material is disposed in the housing between an exterior surface of the conduit and the circuit. The thermally conductive material can have a higher thermal conductivity than the housing. In other aspects, the housing is configured to dissipate heat at a temperature less than or equal to a first temperature, and the interior surface of the conduit is configured to dissipate heat at a second temperature greater than the first temperature. In further embodiments, the interior surface of the conduit includes a plurality of grooves. In still further embodiments, the probe includes a second conduit through the housing that includes an interior surface that defines a second cavity. A third aperture is in fluid communication with a fourth conduit via the second cavity. The third and fourth apertures extend along different outer surfaces of the enclosure.

In yet another embodiment of the disclosed technology, a handheld imaging probe includes an ultrasound transducer array, beamforming electronics and an enclosure at least partially surrounding the transducer array and beamforming electronics. The enclosure includes a first opening and a second opening within different sides of the enclosure. The probe further includes a passive heat exchanger positioned in thermal communication with the transducer array and the beamforming electronics. The heat exchanger includes a sealed tube extending between the first and second openings, a heat spreader positioned at least proximate and/or near the tube, and an air passage defined by an inner surface of the tube. The tube is configured to convey thermal energy away from the ultrasound transducer, the beamforming electronics and the heat spreader via air flowing in and out of the tube through the air passage. In one aspect, the first and second openings are sized to inhibit accessibility of an operator's finger to the inner surface of the tube. In another aspect, the heat spreader has a higher thermal conductivity than the enclosure.

Figure 1B:
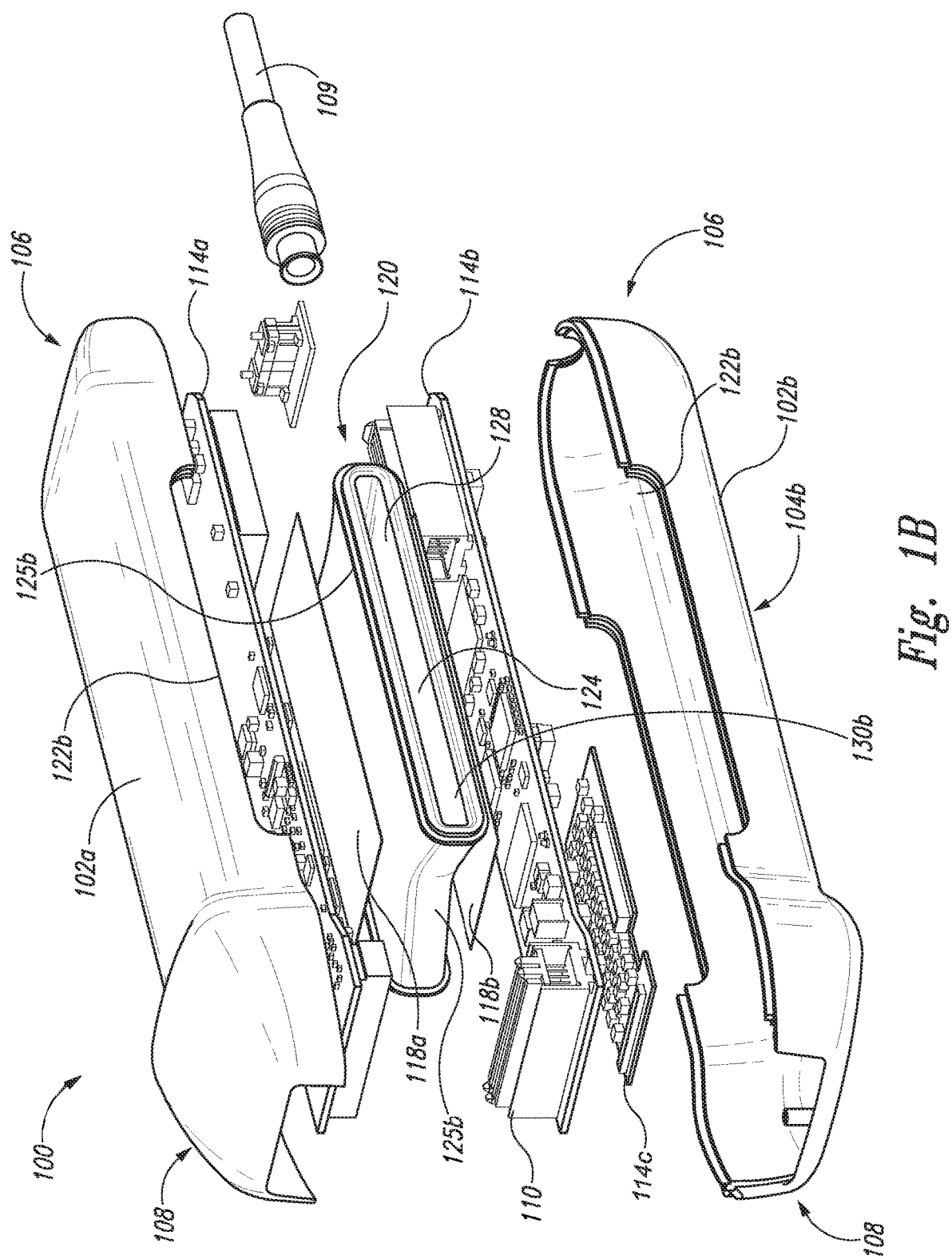
FIGS. 1B and 1C are isometric side exploded views of the ultrasound transducer of FIG. 1A.
Figure 1C:
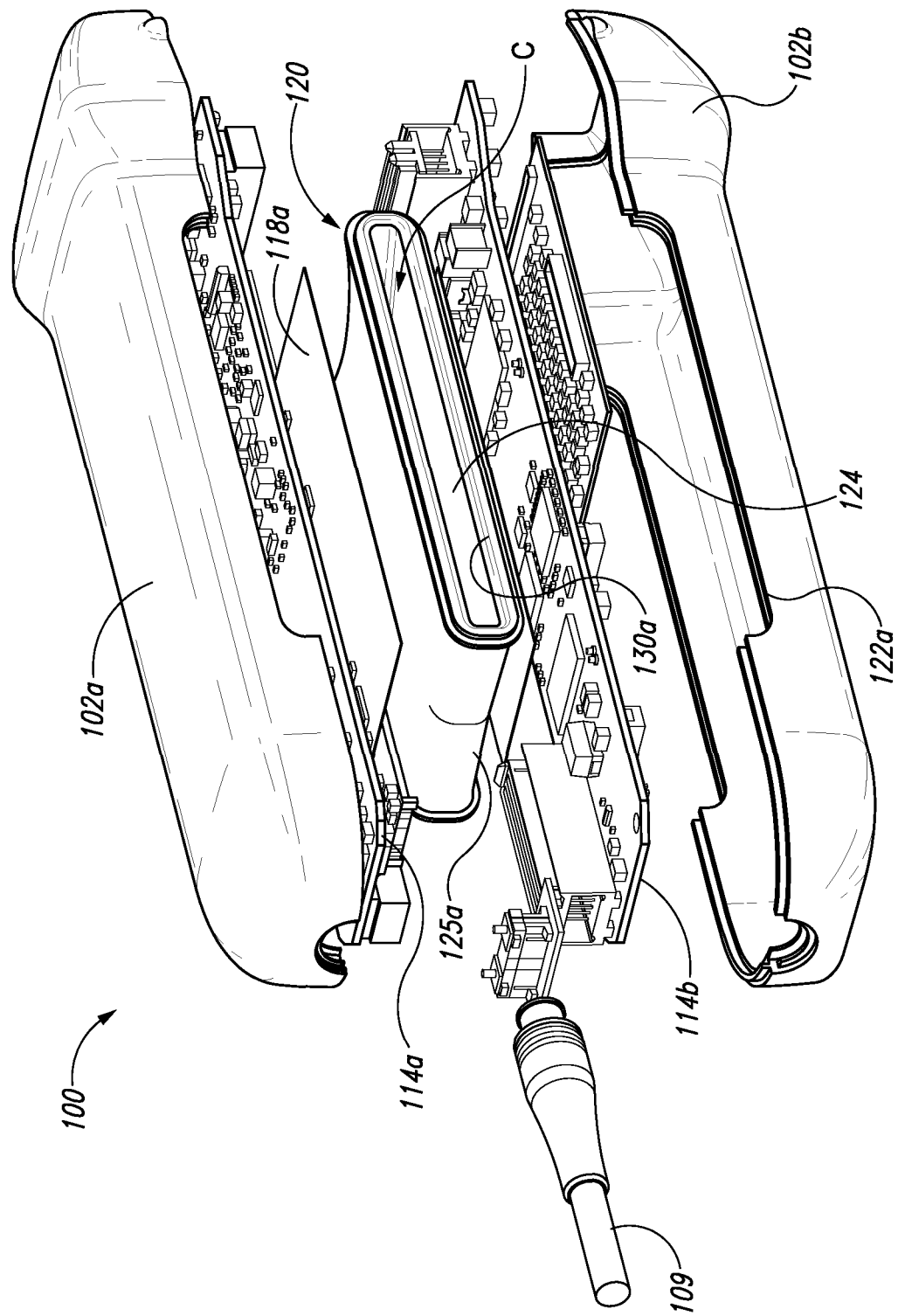
Figure 1D:
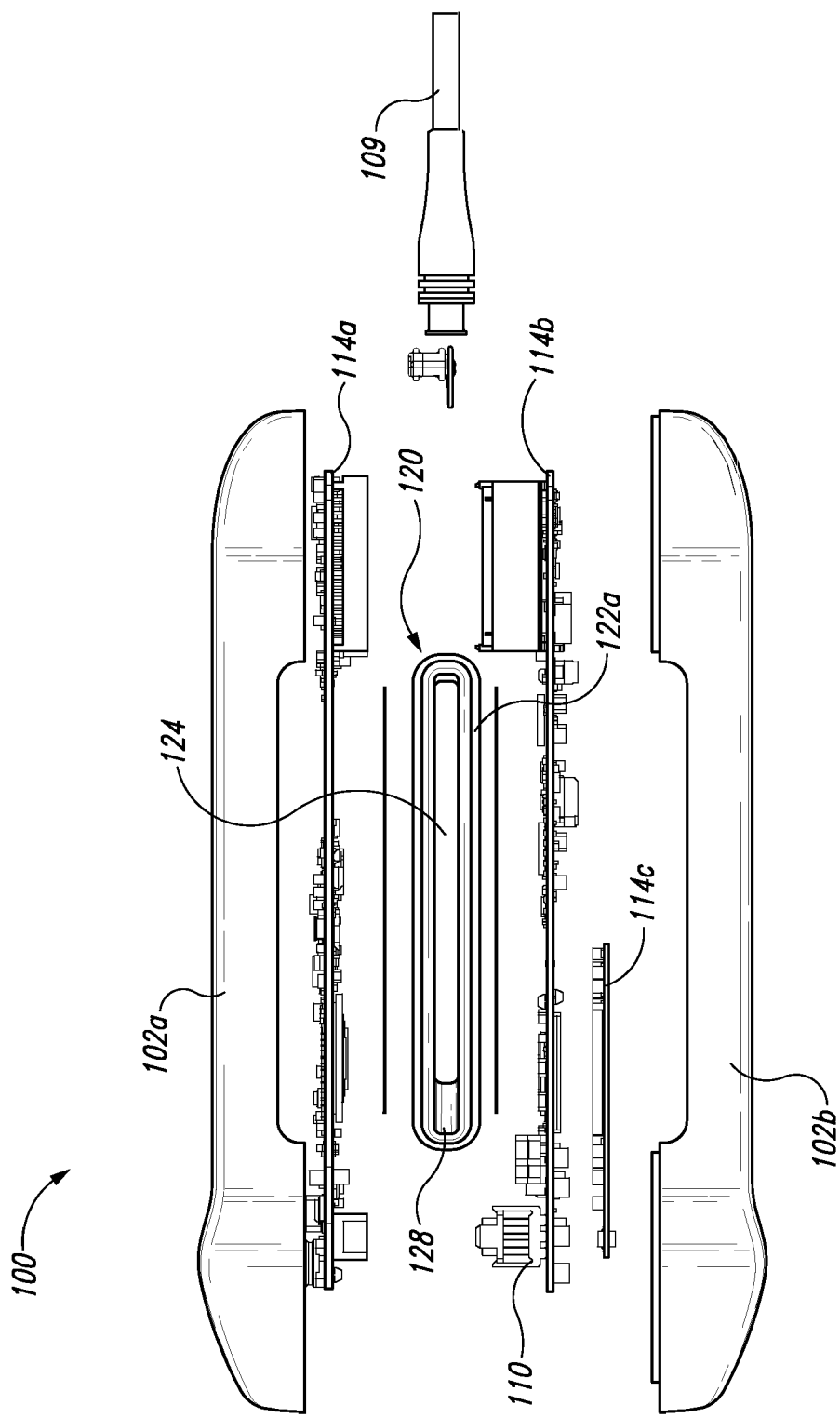
FIG. 1D is a side exploded view of the ultrasound transducer of FIG. 1A.

FIG. 1A is an isometric side view of an ultrasound transducer probe 100 configured in accordance with one embodiment of the disclosed technology. FIGS. 1B and 1C are exploded isometric side views of the probe 100. FIG. 1D is an exploded side view of the probe 100. Referring first to FIGS. 1A-1D together, the probe 100 includes a housing 102 (e.g., an enclosure, a body, a shell, etc.) that defines a cavity 103. The housing 102 includes a first housing portion 102a (e.g., an upper portion) attached or otherwise bonded to a second housing portion 102b (e.g., a lower portion). The housing 102 further includes a first side portion 104a and a second side portion 104b on opposite sides of a longitudinal axis L extending through a proximal end portion 106, an intermediate portion 107 and a distal end portion 108 of the housing 102. A first aperture 122a (e.g., an opening, a hole, etc.) forms an elongated slot that extends longitudinally along the first side portion 104a. A second aperture 122b (e.g., an opening, a hole, etc.) forms an elongated slot that extends longitudinally along the second side portion 104b. The first and second apertures 122a and 122b are configured to inhibit and/or block entry of a finger (e.g., an operator's finger, a patient's finger, etc.) therethrough. The first and second apertures 122a and 122b each have a length that extends between the proximal end portion 106 and the distal end portion 108 and a width that extends between the first housing portion 102a and the second housing portion 102b. In one embodiment, one or both of the length or the width of either the first aperture 122a or the second aperture 122b has a dimension less than a diameter of typical finger (e.g., less than about 5 mm). In some embodiments, for example, one or both of the first and second apertures 122a and 122b can include a length (e.g., between about 10 mm and about 100 mm, between about 15 mm and about 35 mm, or about 25 mm) significantly greater than a width (e.g., between about 2 mm and about 20 mm, between about 3 mm and about 5 mm, or about 4 mm). In further embodiments, a grid and/or a mesh screen, for example, can be disposed within one or both of the first and second apertures 122a and 122b to inhibit entry of a finger.

The housing 102 is configured to at least partially surround an ultrasound transducer assembly 110 (e.g., a single element ultrasound transducer, a one-dimensional ultrasound transducer array, a multi-dimensional ultrasound transducer array, etc.) positioned at least proximate the distal end portion 108. The transducer assembly 110 is electrically connected to system electronics 114 (identified separately as first system electronics 114a, second system electronics 114b and third system electronics 114c). The electronics 114 can include, for example, one or more digital signal processors, beamformers (e.g., analog and/or digital beamformers), image processors (e.g., one or more processors capable of processing B-mode images, M-mode images, Doppler images, etc.), electronic filters, etc. A cable 109 at the proximal end portion 106 communicatively couples the transducer assembly 110 and the system electronics 114 to an external computer and/or display (not/shown).

A conduit 120 (e.g., a duct, tube, etc.) extends through the housing 102 from the first aperture 122a toward the second aperture 122b. The conduit 120 includes a first conduit opening 130a (e.g., an inlet/outlet) and a second conduit opening 130b positioned adjacent the first aperture 122a and the second aperture 122b, respectively. The conduit 120 further includes a proximal end portion 125a opposite a distal end portion 125b. The distal end portion 125b includes an exterior surface defining a pocket or recess configured to receive at least a portion of the transducer assembly 110. In the illustrated embodiment, the conduit 120 is shown positioned in the intermediate portion 107 of the probe 100. In other embodiments, however, the conduit 120 can be positioned at any suitable location within the housing 102. Moreover, the probe 100 in FIGS. 1A-1D includes a single conduit 120. In other embodiments, however, the probe 100 can include a plurality of conduits 120 extending through the housing 102.

An interior surface 128 of the conduit 120 defines a fluid path 124 (e.g., an air pathway, air passage, cavity, through hole, etc.) between the first aperture 122a and the second aperture 122b. The interior surface 128 of the illustrated embodiment is sealed such that air within the conduit 120 cannot flow into the cavity 103. In some embodiments, however, the interior surface 128 can be at least partially open (e.g., via one or more holes or vents) to allow air in the fluid path 124 to flow in and out of the cavity 103. The interior surface 128 can be made from a material (e.g., copper, a copper alloy, aluminum, stainless steel, etc.) having a thermal conductivity greater than a material from which the housing 102 is formed. In other embodiments, however, the interior surface 128 can be made of any suitable heat-resistant material (e.g., thermally conductive materials capable of withstanding temperatures greater than 100 degrees Celsius). In further embodiments, the interior surface 128 can include one or more features (e.g., channels, grooves, ridges, notches, etc.) along at least a portion thereof to increase the surface area thereof, thereby increasing heat dissipation.

A first heat spreader 118a and a second heat spreader 118b are positioned adjacent the conduit 120 and in thermal communication with the interior surface 128, the transducer assembly 110, the electronics 114. The first and second heat spreaders 118a and 118b can comprise, for example, copper, an alloy of copper and/or any other suitable thermally conductive material (e.g., aluminum, graphite, composites that include aluminum and/or copper, etc.). The first and second heat spreaders 118a and 118b are configured to absorb heat from the transducer assembly 110 and in the electronics 114 and transmit heat to the interior surface 128. In some embodiments, for example, the first and second heat spreaders 118a and 118b are directly bonded to the conduit 120 and/or at least partially integrated into the conduit 120. In other embodiments, however, the heat spreaders 118a and 118b are fully integrated with the conduit 120.

The generation of ultrasound energy by the transducer assembly 110 during an ultrasound measurement procedure and/or the processing of ultrasound signals by the electronics 114 can produce significant amounts of heat. For example, during an ultrasound procedure, the transducer assembly 110 and electronics 114 may emit sufficient heat to raise a temperature at the interior surface 128 above for example, 60 degrees Celsius, which could be unsafe to touch. As explained above, however, first and second apertures 122a and 122b are configured to inhibit entry of a finger, thus reducing and/or blocking access to the interior surface 128 to an operator's and/or patient's touch. The disclosed technology therefore is expected to increase an amount of heat that can be produced and/or dissipated by the probe 100 compared to other ultrasound probes without the housing 102 being uncomfortable or unsafe to touch or hold.

In operation, a coolant C (e.g., air, water and/or another suitable coolant) can enter the conduit 120, flow through the fluid path 124 and absorb heat generated by components in the probe 100 before exiting the conduit 120. The coolant C, for example, can enter the conduit 120 at a first temperature through either of the first conduit opening 130a or the second conduit opening 130b. As the coolant C flows through the fluid path 124 in the conduit 120, the coolant C can absorb heat transmitted from, for example, the transducer assembly 110 and/or the electronics 114 via the heat spreaders 118a and 118b and the interior surface 128 thereby convectively cooling the probe 100 and one or more components contained therein.

From the foregoing, it will be appreciated that specific embodiments of the invention have been described herein for purposes of illustration, but that various modifications may be made without deviating from the scope of the invention. For example, although the conduit 120 between the first and second apertures 122a and 122b is shown as a single continuous opening, it will be appreciated that multiple conduits connecting multiple holes or slots can be provided along the length of the probe 100. Accordingly, the invention is not limited except as by the appended claims.

We claim:

1. A handheld ultrasound imaging probe, comprising:
   a transducer assembly at a distal end of the imaging probe;
   electronics coupled to the transducer assembly;
   a housing at least partially enclosing the transducer assembly and the electronics, the housing having a longitudinal axis extending between a proximal end of the imaging probe and the distal end of the imaging probe;
   a heat spreader within the housing configured to absorb heat from the transducer assembly and the electronics; and
   a conduit having an interior surface and an exterior surface opposite to the interior surface and extending from a first side of the housing to a second side of the housing, wherein the first side and the second side are located on opposite sides of the longitudinal axis of the housing, wherein the heat spreader is located between the electronics and the exterior surface of the conduit, and wherein the conduit is configured for a coolant to flow through the conduit from the first side of the housing to the second side of the housing to dissipate the heat absorbed by the heat spreader, wherein the conduit includes a first conduit opening at the first side of the housing and a second conduit opening at the second side of the housing that is opposite to the first side of the housing, and wherein the interior surface of the conduit is a sealed interior surface that defines a cavity, and wherein the first conduit opening and the second conduit opening are configured to prevent accessibility to the cavity and the interior surface of the conduit by a finger of an operator, and wherein the first aperture has a first length along the longitudinal axis and a first width, wherein the first width is less than the first length, and the second aperture has a second length along the longitudinal axis and a second width, wherein the second width is less than the second length.

2. The ultrasound imaging probe of claim 1, wherein the interior surface is sealed from an interior portion of the housing.

3. The ultrasound imaging probe of claim 1, wherein the conduit extends from a first aperture in the first side of the housing to a second aperture in the second side of the housing.

4. The ultrasound imaging probe of claim 1, wherein the heat spreader is bonded to the conduit.

5. The ultrasound imaging probe of claim 1, wherein an exterior surface at the distal end of the conduit includes a recess that is configured to receive at least a portion of the ultrasound transducer assembly.

6. The ultrasound imaging probe of claim 1, wherein the interior surface of the conduit has a thermal conductivity that is greater than the thermal conductivity of the housing.

7. The ultrasound imaging probe of claim 1, wherein the housing is configured to dissipate heat at a temperature less than or equal to a first temperature, and wherein the interior surface of the conduit is configured to dissipate heat at a second temperature greater than the first temperature.

8. The ultrasound imaging probe of claim 1, wherein the conduit includes a plurality of grooves.

9. The ultrasound imaging probe of claim 1, wherein the conduit is a first conduit including a first conduit opening in the first side of the housing and the second conduit opening in the second side of the housing, and wherein the interior surface is a first sealed interior surface that defines a first cavity, and wherein the ultrasound probe further comprises:
   a second conduit extending through the housing, wherein the second conduit includes a second sealed interior surface that defines a second cavity, a third conduit opening in fluid communication with a fourth conduit opening via the second cavity wherein the third conduit opening and fourth conduit opening extend along different outer surfaces of the housing.

10. The handheld ultrasound imaging probe of claim 1, wherein the heat spreader has a thermal conductivity that is higher than the thermal conductivity of the housing.

* * * * *